United States Patent
Ito

(10) Patent No.: US 12,043,312 B2
(45) Date of Patent: Jul. 23, 2024

(54) SUBFRAME

(71) Applicant: HONDA MOTOR CO., LTD., Tokyo (JP)

(72) Inventor: Yuho Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 17/680,405

(22) Filed: Feb. 25, 2022

(65) Prior Publication Data

US 2022/0306203 A1 Sep. 29, 2022

(30) Foreign Application Priority Data

Mar. 29, 2021 (JP) ................................. 2021-054967

(51) Int. Cl.
*B62D 21/03* (2006.01)
*B62D 21/11* (2006.01)

(52) U.S. Cl.
CPC .............. *B62D 21/03* (2013.01); *B62D 21/11* (2013.01)

(58) Field of Classification Search
CPC .................................. B62D 21/03; B62D 21/11
See application file for complete search history.

(56) References Cited

U.S. PATENT DOCUMENTS

| 2015/0075896 | A1* | 3/2015 | Imanishi | ................ | B62D 21/11 180/312 |
| 2021/0009206 | A1* | 1/2021 | Okamoto | ............. | B62D 21/155 |
| 2022/0306201 | A1* | 9/2022 | Ito | ........................ | B62D 29/008 |

FOREIGN PATENT DOCUMENTS

| CN | 207433632 | | 6/2018 | |
| CN | 108688727 | | 10/2018 | |
| CN | 108945106 | | 12/2018 | |
| CN | 209192042 | | 8/2019 | |
| CN | 110562324 | | 12/2019 | |
| CN | 210734284 | | 6/2020 | |
| CN | 210882311 | | 6/2020 | |
| CN | 211494235 | | 9/2020 | |
| EP | 3736197 | A1 * | 11/2020 | ............ B60R 19/12 |
| JP | H0492770 | A * | 3/1992 | |
| JP | 2005-059813 | | 3/2005 | |
| JP | 2010030531 | A * | 2/2010 | |

(Continued)

OTHER PUBLICATIONS

Chinese Office Action for Chinese Patent Application No. 202210162352.1 mailed Apr. 16, 2024.

*Primary Examiner* — Lori Lyjak
(74) *Attorney, Agent, or Firm* — Amin, Turocy & Watson, LLP

(57) ABSTRACT

A subframe includes: a main body part; and a vehicle body support part that supports the main body part to a vehicle body. The vehicle body support part includes: a front end having a front wall portion that extends along a first surface perpendicular to a forward/rearward direction; a rear end having a rear wall portion that extends along a second surface perpendicular to the forward/rearward direction; and a center portion that connects the front wall portion to the rear wall portion and extends along a third surface which crosses with the first surface and the second surface. The center portion includes an upper rib that protrudes upward along a fourth surface perpendicular to the third surface; and a lower rib that protrudes downward along a fifth surface perpendicular to the third surface.

6 Claims, 7 Drawing Sheets

(56) References Cited

FOREIGN PATENT DOCUMENTS

| JP | 2012006545 A | * | 1/2012 | ............. B62D 21/11 |
| JP | 2013006518 A | * | 1/2013 | |
| JP | 2014101013 A | * | 6/2014 | |
| JP | 2017081446 A | * | 5/2017 | |
| JP | 2019209882 A | * | 12/2019 | ............. F16D 41/07 |
| WO | WO-2014167729 A1 | * | 10/2014 | ............. B62D 21/11 |
| WO | WO-2014175431 A1 | * | 10/2014 | ................ B22C 9/10 |
| WO | WO-2015087874 A1 | * | 6/2015 | ............. B62D 21/11 |
| WO | WO-2015189909 A1 | * | 12/2015 | ............. B62D 21/00 |

* cited by examiner

SUBFRAME

CROSS-REFERENCE TO RELATED APPLICATION

Priority is claimed on Japanese Patent Application No. 2021-054967, filed on Mar. 29, 2021, the contents of which are incorporated herein by reference.

BACKGROUND

Field of the Invention

The present invention relates to a subframe.

Background

In the related art, a suspension member that is fixed to a lower part of a vehicle body is known (for example, refer to Japanese Unexamined Patent Application, First Publication No. 2005-59813).

SUMMARY

However, there is room for improvement in the stiffness of the suspension member described in Japanese Unexamined Patent Application, First Publication No. 2005-59813.

An object of an aspect of the present invention is to provide a subframe having a high stiffness.

A subframe according to a first aspect of the present invention includes a main body part; and a vehicle body support part that supports the main body part to a vehicle body, wherein the vehicle body support part includes: a front end having a front wall portion that extends along a first surface perpendicular to a forward/rearward direction; a rear end having a rear wall portion that extends along a second surface perpendicular to the forward/rearward direction; and a center portion that connects the front wall portion to the rear wall portion and extends along a third surface which crosses with the first surface and the second surface, and the center portion includes an upper rib that protrudes upward along a fourth surface perpendicular to the third surface; and a lower rib that protrudes downward along a fifth surface perpendicular to the third surface.

According to this configuration, the vehicle body support part includes the front wall portion that extends along the first surface perpendicular to the forward/rearward direction at the front end of the vehicle body support part; the rear wall portion that extends along the second surface perpendicular to the forward/rearward direction at the rear end of the vehicle body support part; and the center portion that connects the front wall portion to the rear wall portion and extends along the third surface which crosses with the first surface and the second surface. The center portion includes the upper rib that protrudes upward along the fourth surface perpendicular to the third surface; and the lower rib that protrudes downward along the fifth surface perpendicular to the third surface. Thereby, while maintaining a position relationship between the main body part and a vehicle body connection portion that is located at an upper end of the vehicle body support part, a neutral axis (or the center of a figure) of the cross-section of the vehicle body support part can be located as low as possible close to the main body part while ensuring the flexural stiffness of the vehicle body support part.

Accordingly, it is possible to enhance a natural frequency in a torsional mode of the entire subframe using the vehicle body connection portion that is located at the upper end of the vehicle body support part as a fulcrum, that is, it is possible to enhance a torsional stiffness of the subframe. Accordingly, it is possible to provide a subframe having a high stiffness. Further, by moving the position of the center portion, it is possible to easily adjust the natural frequency in the torsional mode, and it is possible to increase the degree of design freedom of the subframe.

In a second aspect, the subframe may include a suspension connection part that is connected to a suspension device which supports a wheel axis, wherein the front wall portion may continue to the suspension connection part along an identical plane.

According to this configuration, the front wall portion continues to the suspension connection part along the identical plane. Thereby, it is possible to enhance the stiffness of the suspension connection part, and it is possible to enhance the stiffness of the vehicle body support part.

In a third aspect, the vehicle body support part may include a boss portion in which a seat surface of a connection member that is connected to the vehicle body is provided on a lower portion of the boss portion, and the center portion may be located at a lower position than the seat surface.

According to this configuration, the vehicle body support part includes the boss portion in which the seat surface of the connection member that is connected to the vehicle body is provided on the lower portion of the boss portion, and the center portion is located at the lower position than the seat surface. Thereby, the neutral axis can be located close to the main body part. Accordingly, while maintaining the position relationship between the main body part and the vehicle body connection portion that is located at the upper end of the vehicle body support part, it is possible to enhance the flexural stiffness of the vehicle body support part and the stiffness of the subframe.

In a fourth aspect, the vehicle body support part may include a reinforcement wall that extends from an upper end of the center portion to the boss portion.

According to this configuration, the vehicle body support part includes the reinforcement wall that extends from the upper end of the center portion to the boss portion. Thereby, it is possible to further enhance the stiffness of the vehicle body connection portion and the stiffness of the vehicle body support part.

In a fifth aspect, the main body part may include a main body side wall that extends in the forward/rearward direction along a surface perpendicular to a vehicle width direction, and the rear wall portion may protrude outward further than the main body side wall.

According to this configuration, the main body part includes the main body side wall that extends in the forward/rearward direction along the surface perpendicular to the vehicle width direction, and the rear wall portion protrudes outward further than the main body side wall. Thereby, it is possible to further enhance the stiffness of the vehicle body support part and the stiffness of the subframe.

In a sixth aspect, the main body part may include a main body rib that protrudes downward, and at least one of the front wall portion and the rear wall portion may continue to the main body rib.

According to this configuration, the main body part includes the main body rib that protrudes downward, and at least one of the front wall portion and the rear wall portion continues to the main body rib. Thereby, it is possible to further enhance the stiffness of the vehicle body support part and the stiffness of the subframe.

According to an aspect of the present invention, it is possible to provide a subframe having a high stiffness.

DESCRIPTION OF EMBODIMENTS

Figure 1:
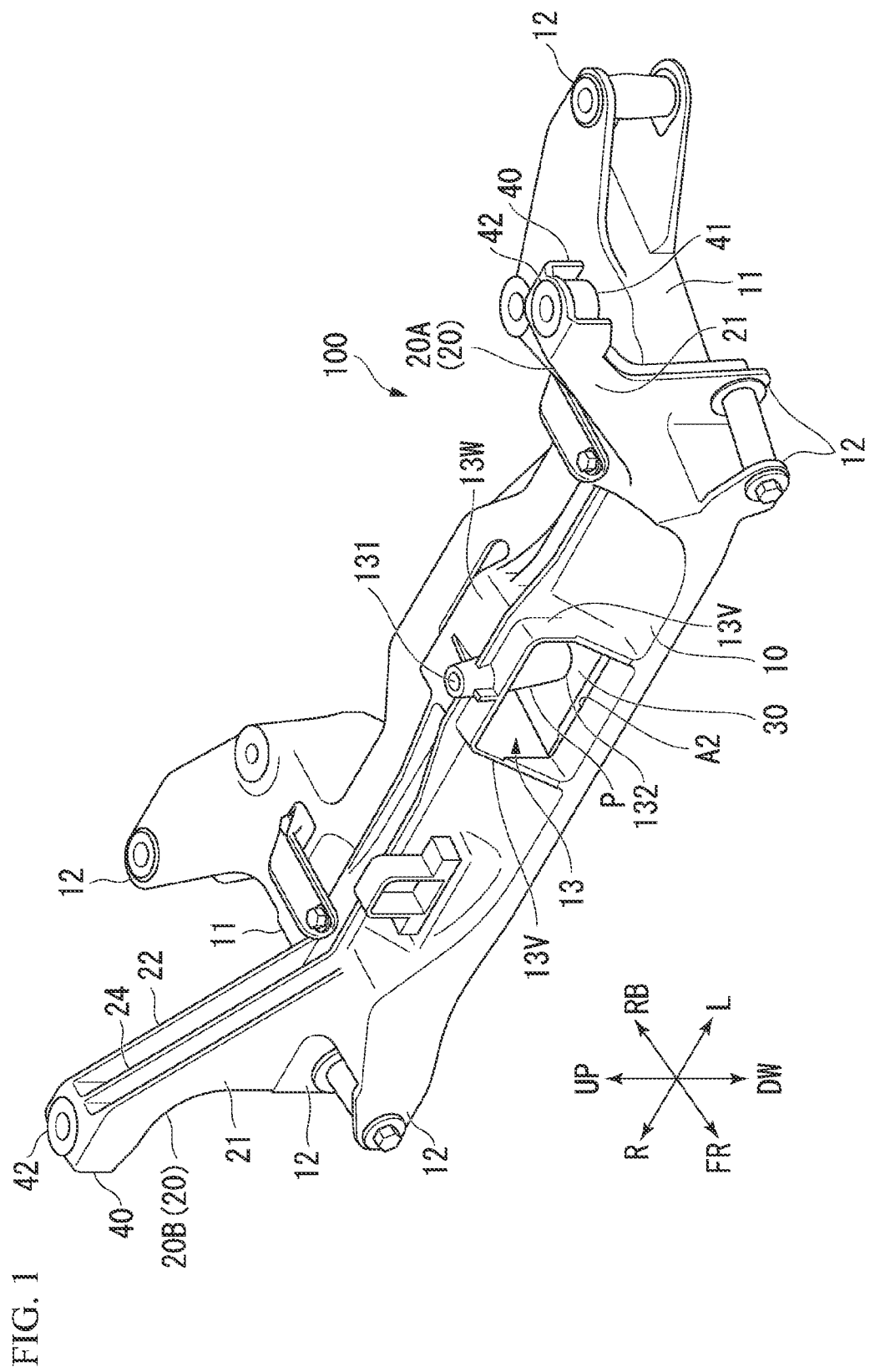
FIG. 1 is a perspective view of a subframe when seen from an upward forward direction according to an embodiment of the present invention.

Hereinafter, a subframe 100 according to an embodiment of the present invention will be described with reference to the drawings. In the drawings, an arrow FR represents a forward direction of a vehicle, an arrow RB represents a rearward direction of the vehicle, an arrow UP represents an upward direction of the vehicle, an arrow DW represents a downward direction of the vehicle, an arrow L represents a leftward direction of the vehicle, and an arrow R represents a rightward direction. A rightward/leftward direction of the vehicle may be referred to as a vehicle width direction. A center side of the vehicle in the vehicle width direction may be referred to as an inward direction, and a direction away from the center side of the vehicle in the vehicle width direction may be referred to as an outward direction. The subframe 100 has a substantially symmetrical structure in the rightward/leftward direction. Accordingly, hereinafter, right and left configuration members may be described with the same reference numerals.

Figure 2:
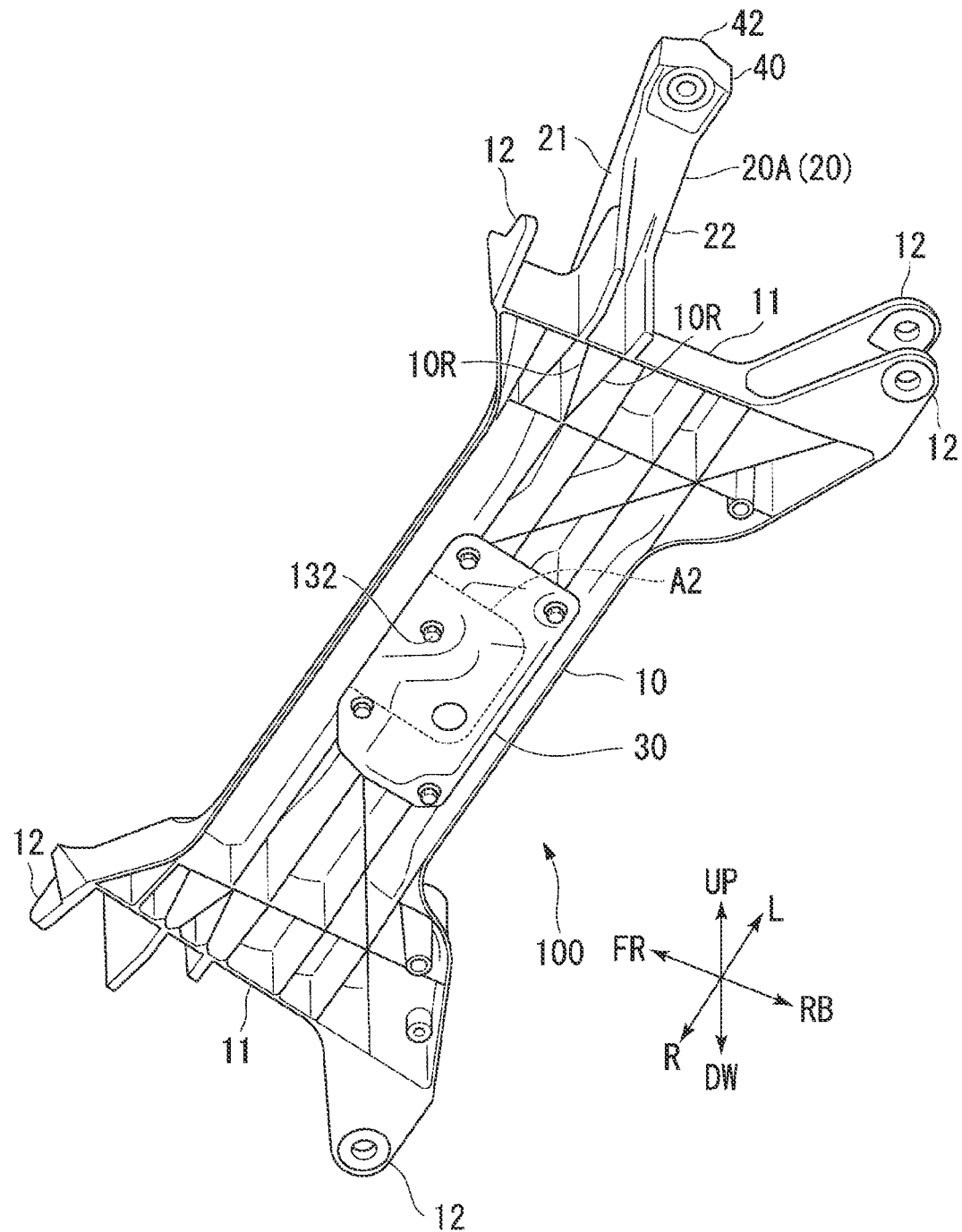
FIG. 2 is a perspective view of the subframe when seen from a downward rearward direction according to the embodiment.
Figure 3:
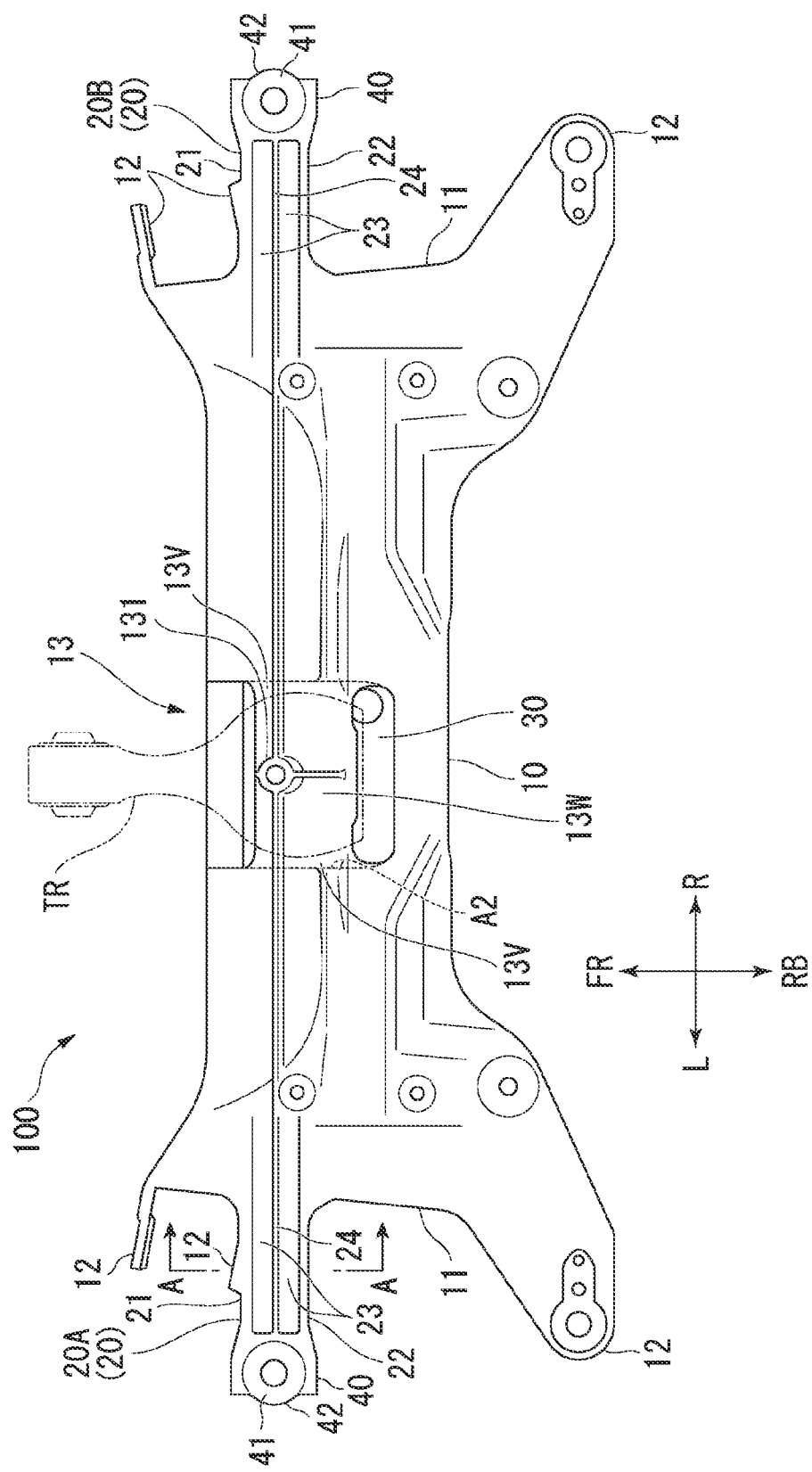
FIG. 3 is a plan view of the subframe according to the embodiment.
Figure 4:
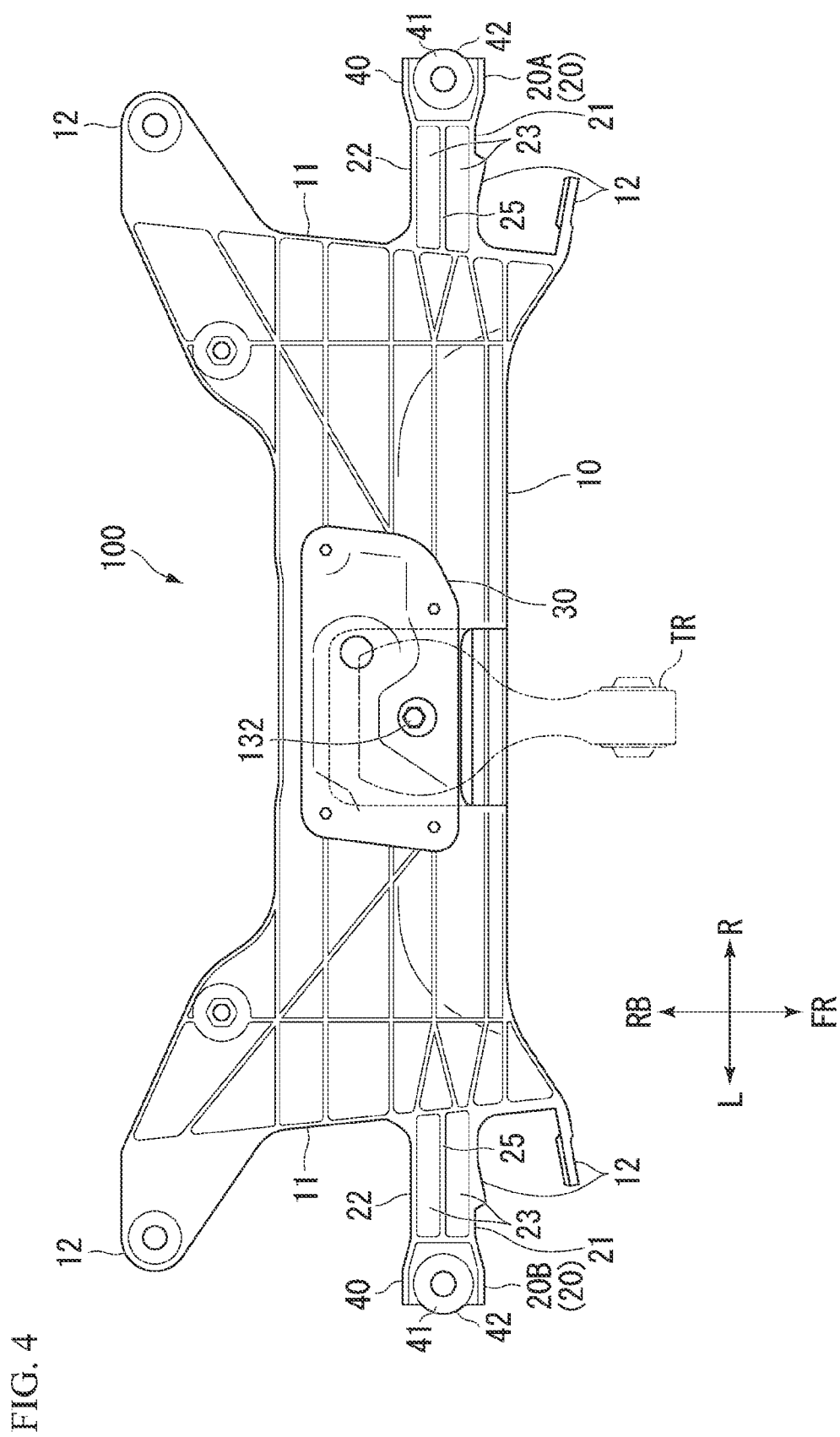
FIG. 4 is a bottom view of the subframe according to the embodiment.

FIG. 1 is a perspective view of the subframe 100 when seen from an upward forward direction according to the embodiment of the present invention. FIG. 2 is a perspective view of the subframe 100 when seen from a downward forward direction according to the embodiment. FIG. 3 is a plan view of the subframe 100 according to the embodiment. FIG. 4 is a bottom view of the subframe 100 according to the embodiment.

(Subframe)

As shown in FIG. 1 to FIG. 4, the subframe 100 is a member that constitutes part of a skeleton of a vehicle together with a vehicle body (not shown). The subframe 100 is provided below the vehicle body.

The subframe 100 includes a main body part 10 and a vehicle body support part 20 that supports the main body part 10 to the vehicle body. The main body part 10 and the vehicle body support part 20 are, for example, integrally formed by a die-cast molding method. The main body part 10 and the vehicle body support part 20 are, for example, made of an alloy of a non-iron metal such as aluminum.

(Main Body Part)

The main body part 10 is supported by the vehicle body support part 20 to the vehicle body.

The main body part 10 includes a suspension connection part 12 that is connected to a suspension device (not shown) which supports a wheel axis; and a torque rod support part 13. In the main body part 10, a vehicle component such as a stabilizer or a steering gear box is appropriately arranged in a space between the main body part 10 and the vehicle body.

The main body part 10 includes a main body side wall 11 that extends in a forward/rearward direction along a surface perpendicular to the vehicle width direction. Thereby, it is possible to enhance the flexural stiffness and the torsional stiffness of the subframe 100.

The main body part 10 includes a main body rib 10R that protrudes downward. The main body rib 10R is a plate body, and a plurality of main body ribs 10R may be provided on the main body part 10. The plurality of main body ribs 10R may be arranged along planes having normal lines in directions different from each other and may be provided to cross with each other. Thereby, it is possible to enhance the flexural stiffness and the torsional stiffness of the subframe 100.

The suspension connection part 12 supports a suspension arm (not shown) of the suspension device by a hinge. The suspension connection part 12 is, for example, constituted of two plate bodies branched into two parts from the main body part 10. Each of the two plate bodies includes a hole that locks a shaft which constitutes the hinge. Two pairs of the suspension connection part 12 may be provided on right and left sides of the main body part 10.

<Torque Rod Support Part>

The torque rod support part 13 supports a torque rod TR that is connected to a power unit (not shown). One end of the torque rod TR is connected to the subframe 100 by a hinge via a bush (not shown). Another end of the torque rod TR is connected to a power unit such as an engine. The torque rod support part 13 is arranged at the middle of the main body part 10 in the vehicle width direction.

In detail, the torque rod support part 13 protrudes above the main body part 10 from an upper surface of the main body part 10. The torque rod support part 13 forms a space in which one end of the torque rod TR can be accommodated. The torque rod support part 13 includes: a top plate 13W that supports one end of a shaft P which supports the torque rod TR; and a side plate 13V. The shaft P constitutes a hinge that swingably supports the torque rod TR.

The top plate 13W is a plate body having a substantially horizontal surface along an upper surface of the main body part 10. The top plate 13W is located at an upper position than the upper surface of the main body part 10. The top plate 13W has a space at a lower position that can accommodate the torque rod TR. The top plate 13W is formed integrally with the main body part 10 via the side plate 13V that extends upward from the main body part 10. The top plate 13W includes a first shaft support part 131 substantially at the middle in a plan view. A reinforcement plate 30 is provided below the top plate 13W to be away from the accommodation space of the torque rod TR and a lower opening part A2. The first shaft support part 131 that is provided on the top plate 13W supports one end of the shaft P. A second shaft support part 132 that is provided on the reinforcement plate 30 supports the other end of the shaft P.

(Vehicle Body Support Part)

Figure 5:
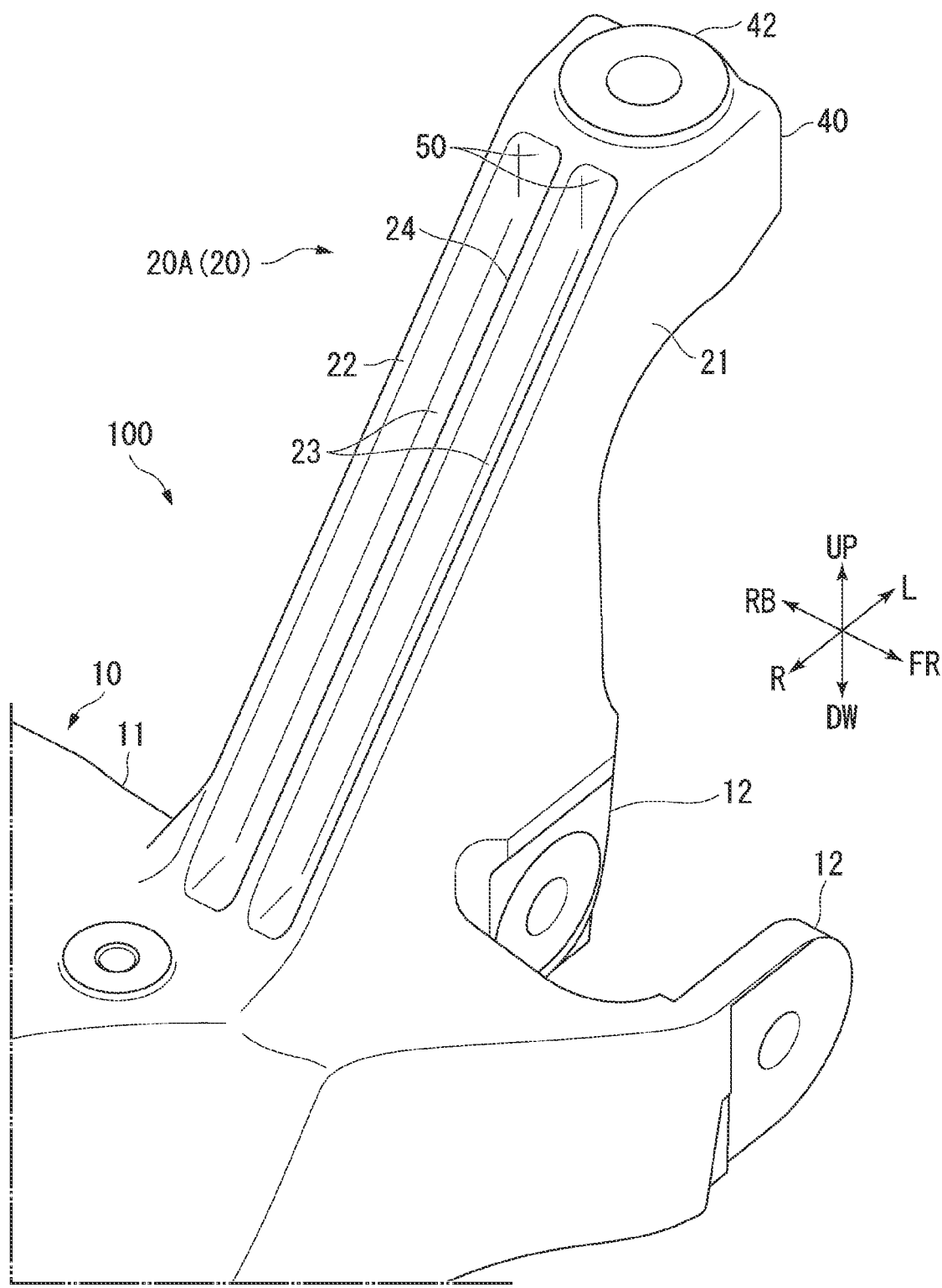
FIG. 5 is a perspective view of a left vehicle body support part when seen from an upward forward direction according to the embodiment.
Figure 6:
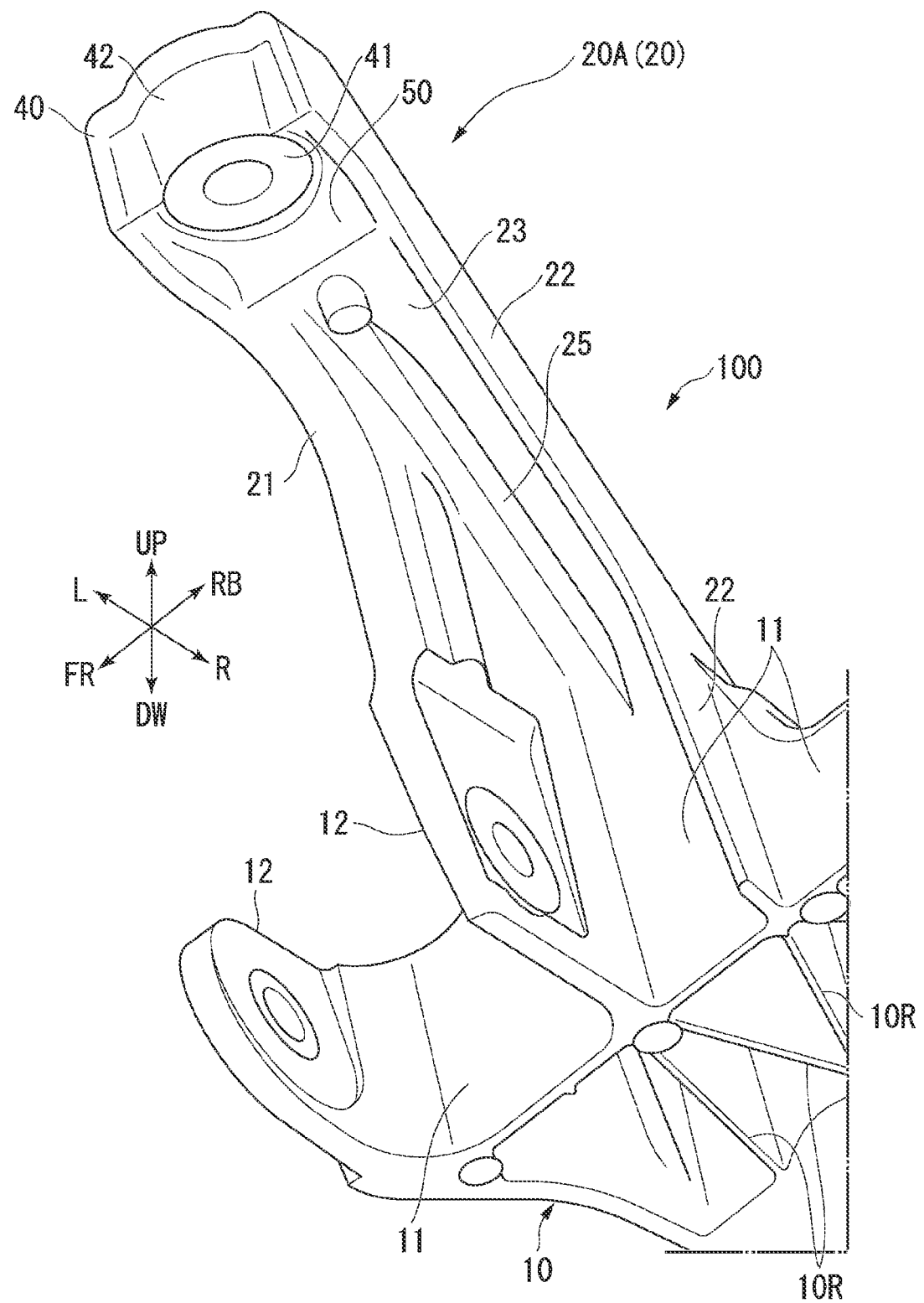
FIG. 6 is a perspective view of the left vehicle body support part when seen from a downward rearward direction according to the embodiment.
Figure 7:
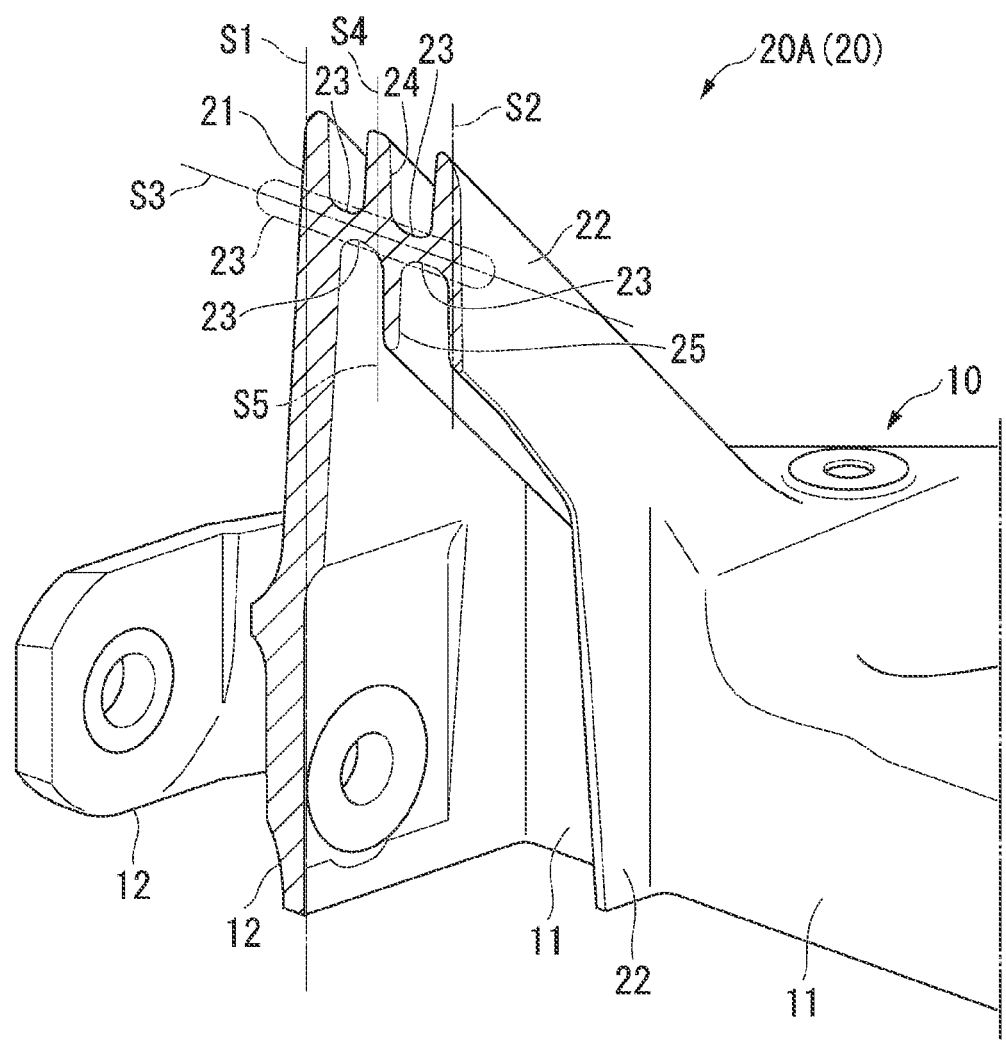
FIG. 7 is a cross-sectional perspective view of a line A-A in FIG. 3.
Figure 7:
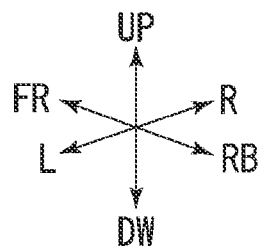

FIG. 5 is a perspective view of a left vehicle body support part 20A when seen from an upward forward direction according to the embodiment. FIG. 6 is a perspective view of the left vehicle body support part 20A when seen from a downward rearward direction according to the embodiment. FIG. 7 is a cross-sectional perspective view of a line A-A in FIG. 3.

The vehicle body support part 20 is a part that supports the main body part 10 to the vehicle body. The vehicle body support part 20 includes: the left vehicle body support part 20A that is disposed on a left side of the main body part 10 and is supported by a left side of the vehicle body; and a right vehicle body support part 20B that is disposed on a right side of the main body part 10 and is supported by a right side of the vehicle body. The left vehicle body support part 20A and the right vehicle body support part 20B are arranged symmetrically in the rightward/leftward direction to be away from each other in the vehicle width direction.

The left vehicle body support part 20A and the right vehicle body support part 20B extend upward. In detail, each of the left vehicle body support part 20A and the right vehicle body support part 20B extends obliquely outward to be separated from each other toward the upward direction. The subframe 100 (the main body part 10) bridges the vehicle body in the vehicle width direction by the left vehicle body support part 20A and the right vehicle body support part 20B in a state where a space is formed between the vehicle body and the main body part 10. The subframe 100 may include not only the left vehicle body support part 20A and the right vehicle body support part 20B but another vehicle body support part 20.

The vehicle body support part 20 includes a vehicle body connection portion 40 that is connected to the vehicle body at an upper portion of the vehicle body support part 20. The vehicle body connection portion 40 includes a boss portion 42 in which a seat surface 41 of a connection member (not shown) such as a pin or a bolt that is connected to the vehicle body is provided on a lower portion. In this way, since the vehicle body support part 20 includes the boss portion 42 in the vehicle body connection portion 40, it is possible to enhance the stiffness of the vehicle body connection portion 40 that connects the vehicle body and the vehicle body support part 20, and it is possible to reliably fix the subframe 100 to the vehicle body.

In detail, as shown in FIG. 7, the vehicle body support part 20 includes a front wall portion 21 that extends along a first surface S1 perpendicular to the forward/rearward direction at a front end of the vehicle body support part 20; a rear wall portion 22 that extends along a second surface S2 perpendicular to the forward/rearward direction at a rear end of the vehicle body support part 20; and a center portion 23 that connects the front wall portion 21 to the rear wall portion 22 and extends along a third surface S3 which crosses with the first surface S1 and the second surface S2. The center portion 23 includes an upper rib 24 that protrudes upward along a fourth surface S4 perpendicular to the third surface S3; and a lower rib 25 that protrudes downward along a fifth surface S5 perpendicular to the third surface S3. Thereby, while maintaining a position relationship between the main body part 10 and the vehicle body connection portion 40 that is located at an upper end of the vehicle body support part 20, a neutral axis (or the center of a figure) of the cross-section of the vehicle body support part 20 can be located as low as possible close to the main body part 10 while ensuring the flexural stiffness of the vehicle body support part 20. Accordingly, it is possible to enhance a natural frequency in a torsional mode of the entire subframe 100 using the vehicle body connection portion 40 that is located at the upper end of the vehicle body support part 20 as a fulcrum, that is, it is possible to enhance a torsional stiffness of the subframe 100. Accordingly, it is possible to provide a subframe 100 having a high stiffness. Further, by moving the position of the center portion 23, it is possible to easily adjust the natural frequency in the torsional mode, and it is possible to increase the degree of design freedom of the subframe 100.

The third surface S3 may cross perpendicular to the first surface S1 and the second surface S2. The fourth surface S4 and the fifth surface S5 may be on an identical plane. That is, in the cross-section shown in FIG. 7, the upper rib 24 and the lower rib 25 may be continuous in a straight line in the vertical direction. The front wall portion 21, the rear wall portion 22, the center portion 23, the upper rib 24, and the lower rib 25 may be along a virtual plane of the first surface S1 to the fifth surface S5 as described above, and the thickness may not be uniform or may be uniform.

Here, the front wall portion 21 continues to the suspension connection part 12 along the identical plane. In other words, as shown in FIG. 7, the plate body that constitutes the suspension connection part 12 extends along the first surface S1 and is continuously connected to the front wall 21 in the vertical direction. Thereby, it is possible to enhance the stiffness of the suspension connection part 12, and it is possible to enhance the stiffness of the vehicle body support part 20.

As shown in FIG. 6, the center portion 23 is located at a lower position than the seat surface 41 that is provided on the boss portion 42. Thereby, the neutral axis can be located close to the main body part 10. Accordingly, while maintaining the position relationship between the main body part 10 and the vehicle body connection portion 40 that is located at the upper end of the vehicle body support part 20, it is possible to enhance the flexural stiffness of the vehicle body support part 20 and the stiffness of the subframe 100.

As shown in FIG. 5 and FIG. 6, the vehicle body support part 20 includes a reinforcement wall 50 that extends from an upper end of the center portion 23 to the boss portion 42. The reinforcement wall 50 is provided between the front wall 21 and the rear wall 22 and an upper end of the upper rib 24 or the lower rib 25. The reinforcement wall 50 may be a plate body that extends along a surface perpendicular to the first surface S1, the second surface S2, the fourth surface S4, or the fifth surface S5. The reinforcement wall 50 may be a plate body that extends along a surface parallel to an axis center of the boss portion 42. Thereby, it is possible to further enhance the stiffness of the vehicle body connection portion 40 and the stiffness of the vehicle body support part 20.

As shown in FIG. 6 and FIG. 7, the rear wall portion 22 protrudes outward further than the main body side wall 11 of the main body part 10. The rear wall portion 22 extends continuously in the vertical direction to the outside of the main body part 10 from a rear end of the vehicle body support part 20. Thereby, it is possible to further enhance the stiffness of the vehicle body support part 20 and the stiffness of the subframe 100.

As shown in FIG. 2 and FIG. 6, at least one of the front wall portion 21 and the rear wall portion 22 continues to the main body rib 10R of the main body part 10. As shown in FIG. 2 and FIG. 6, both of the front wall portion 21 and the rear wall portion 22 may continue to the main body rib 10R of the main body part 10. Thereby, it is possible to further enhance the stiffness of the vehicle body support part 20 and the stiffness of the subframe 100.

The technical scope of the present invention is not limited to the embodiment described above, and various modifications can be made without departing from the scope of the invention.

For example, the suspension connection part 12 may also serve as the vehicle body support part 20. That is, the suspension connection part 12 may be connected to the suspension device and be supported by the vehicle body by fastening the suspension connection part 12, part of the suspension device, and part of the vehicle body together by an appropriate fastener.

Further, for example, the subframe 100 may further include a plurality of vehicle body support parts 20 in addition to the left vehicle body support part 20A and the right vehicle body support part 20B. In that case, any of the vehicle body supports may have the characteristic of the vehicle body support part 20 according to the above embodiment.

A component in the embodiment described above can be replaced by a known component without departing from the scope of the present invention, and the modification example described above may be appropriately combined.

What is claimed is:

1. A subframe comprising:
   a main body part; and
   a vehicle body support part that supports the main body part to a vehicle body,
   wherein the vehicle body support part comprises:
      a front end having a front wall portion that extends along a first surface perpendicular to a forward/rearward direction;
      a rear end having a rear wall portion that extends along a second surface perpendicular to the forward/rearward direction; and
      a center portion that connects the front wall portion to the rear wall portion and extends along a third surface which crosses with the first surface and the second surface,
   and the center portion includes an upper rib that protrudes upward along a fourth surface perpendicular to the third surface; and a lower rib that protrudes downward along a fifth surface perpendicular to the third surface.

2. The subframe according to claim 1, comprising:
   a suspension connection part that is connected to a suspension device which supports a wheel axis,
   wherein the front wall portion continues to the suspension connection part along an identical plane.

3. The subframe according to claim 1,
   wherein the vehicle body support part includes a boss portion in which a seat surface of a connection member that is connected to the vehicle body is provided on a lower portion of the boss portion, and
   the center portion is located at a lower position than the seat surface.

4. The subframe according to claim 3,
   the vehicle body support part includes a reinforcement wall that extends from an upper end of the center portion to the boss portion.

5. The subframe according to claim 1,
   wherein the main body part includes a main body side wall that extends in the forward/rearward direction along a surface perpendicular to a vehicle width direction, and
   the rear wall portion protrudes outward further than the main body side wall.

6. The subframe according to claim 1,
   the main body part includes a main body rib that protrudes downward, and
   at least one of the front wall portion and the rear wall portion continues to the main body rib.

* * * * *